July 7, 1959   D. R. STERN ET AL   2,893,838
CONTINUOUS ELECTROTHERMIC PRODUCTION OF BORIC OXIDE
Filed Dec. 14, 1956

INVENTORS
David Russell Stern
Aiji Alvin Uchiyama
ECKHOFF & SLICK
ATTORNEYS
BY
A MEMBER OF THE FIRM

United States Patent Office 2,893,838
Patented July 7, 1959

2,893,838

CONTINUOUS ELECTROTHERMIC PRODUCTION OF BORIC OXIDE

David Russell Stern, Fullerton, and Aiji Alvin Uchiyama, Pasadena, Calif., assignors to American Potash & Chemical Corporation, a corporation of Delaware Application December 14, 1956, Serial No. 628,346

3 Claims. (Cl. 23—149)

This invention relates to the production of boric oxide.

The applications for boric oxide as a raw material are on the increase; it is an important raw material for many organic syntheses; it is utilized in the glass industry; it can be used to synthesize various boron halides, carbides, nitrides, and metallic borides. These are only a few of its potential applications. Nevertheless, the present methods of production with their inherent disadvantages of cost and capacity have limited the widespread use of this compound in boron chemistry and in industry.

Boric oxide is customarily produced by the thermal dehydration of any one of the three boric acids, the thermal energy being derived from a combustion process, as by burning natural gas. However, the energy efficiency is low, usually about 10 percent, while the reaction residence times are quite high usually of the order of twelve hours. Such a process requires very large units for rather small throughput capacities. Since a solid boric acid has a tendency to dust, the combustion gases cannot be brought into direct contact with the feed acid; the usual practice includes the use of heat transfer tubes. The corrosive nature of boric oxide and the high temperature required to drive off the last quantities of water has always made materials of construction a problem and has resulted in high maintenance costs. Finally, the high viscosity of boric oxide, coupled with these other problems, makes it unsuitable, under our observations, for receiving heat energy predominately by the mechanisms of conduction and convection inherent in the presently practiced purely thermal processes.

We have found that we can produce boric oxide of at least 99.0 percent purity starting with a suitable commercial grade of boric acid by an electrothermic process with high energy efficiencies, low residence times, and at chemical efficiencies in excess of 99.0 percent. We have operated the process in the temperature range of 320–1000° C., with residence times from 1.0–7.0 hours securing chemical efficiencies of 93.9 to 99.6 percent. These are not limiting conditions since we can vary residence time and the temperature employed independently of product purity. We prefer to operate between about 450–800° C. as the temperature gradient across the boric oxide; at a radiant element temperature of about 900° C.; and at a residence time of about 1.5 hours.

The invention includes other objects and features of advantage, some of which, together with the foregoing, will appear hereinafter wherein a present preferred form of apparatus for practicing this invention is disclosed. Referring to the drawing accompanying and forming a part hereof, Figure 1 is a plan view of an apparatus which has been utilized to practice the invention.

Figure 1:
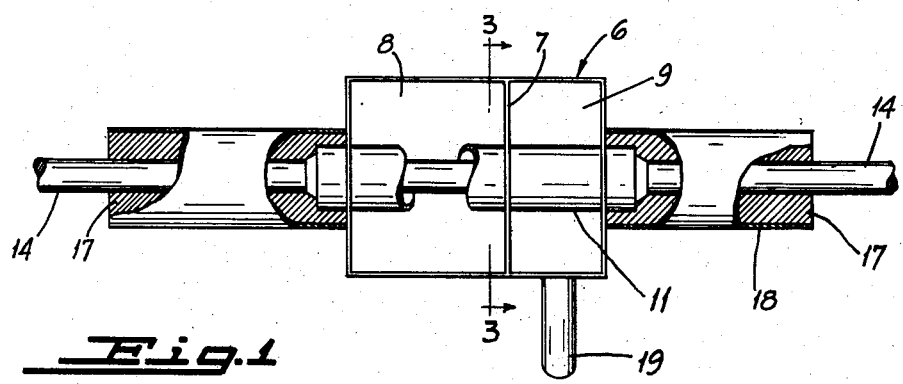
Figure 2:
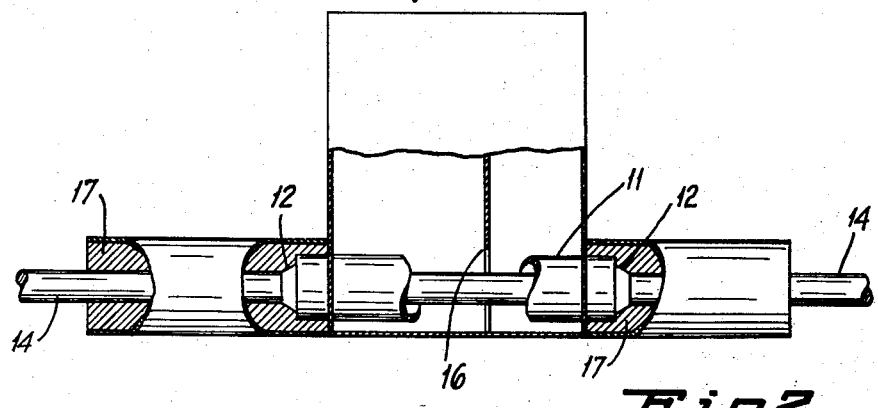
Figure 2 is a side elevation, partly in section, through an apparatus embodying the present invention.

Referring to the drawings, the numeral 6 represents a vessel of generally rectangular shape, this being a convenient form for manufacture and use.

The vessel 6 is divided by a transverse wall 7 into a first compartment 8 and a second compartment 9. Extending longitudinally of the vessel 6 is a quartz tube 11. A suitable electrical resistance rod 14 extends through the tube 11; in use, a suitable electric potential is applied across opposite ends of the rod 14 to heat the latter to a suitable temperature at which it is effective to release radiant heat.

Figure 3:
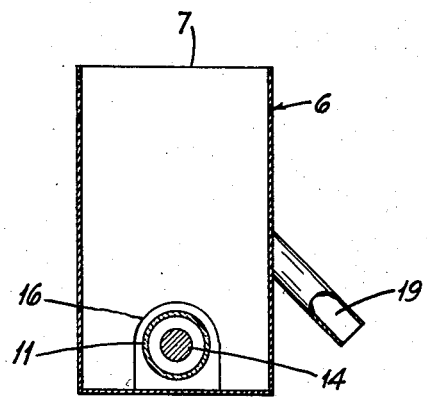
Figure 3 is a section along the line 3—3 in Figure 1.

Referring particularly to Figure 3, it is to be noted that wall 7 includes an aperture 16 about the quartz tube, thus permitting passage between compartments 8 and 9 of a continuous but restricted amount of the material in compartment 8.

Transite bushings 17 serve to seal the ends of the rod 14 and the quartz tube 11. An outlet 19 is provided from compartment 9 through which molten boric oxide is withdrawn.

The vessel 6 can be constructed of any suitable material of construction and we have utilized vessels made of a ceramic and of a metal such as stainless steel. Since the temperature gradient is from the inside out the coldest boric oxide is in contact with the walls of the vessel. Stainless steel has been very satisfactory. However, another advantage of our invention allows other materials of construction to be employed since we can operate such that the inner walls of the crucible 6 can be coated with a film of solid boric oxide. This phenomenon is accomplished when the total heat input, feed rate, and rate of withdrawing are balanced with the heat loss from the system. This is also a function of the geometry of the furnace. We have presented as an illustration a furnace with corresponding dimensions, the capacity of which is 15 pounds per day. Having thus taught the invention, it will be apparent to those skilled in the art that a furnace of substantially increased output can be constructed based on the criteria disclosed herein.

Before putting the apparatus into operation, boric acid is first dehydrated in a suitable crucible and the molten boric oxide is then poured into the vessel to fill the same. In operation, the apparatus is originally charged with boric oxide and as soon as this is melted and is molten, a suitable boric acid is fed continuously to compartment 8 and the product continuously withdrawn through the outlet 19. Dehydration is practically completed in the first compartment 8 and what little water remains is driven off when the material passes through the passage 16 into the compartment 9.

There is a tendency for the boric acid to foam in a dehydration process and the resulting loss of boric acid by entrainment results in a lower chemical efficiency. We have discovered we can eliminate this problem by feeding the boric acid at such a rate and in such a manner that a crust or pile of boric acid is maintained over the top of compartment 8. This holds down any foam and results in a partial dehydration of the boric acid even before it enters the melting zone. The molten boric oxide containing some water flows through the restricted passage at a higher velocity and in relatively small volume so that it receives additional radiant energy during its passage; this results in its final dehydration in the second compartment from which it overflows. Thus, the heating element and its transparent protection tube are not subjected to high concentrations of water vapor at high temperatures.

We have used carbon rods or silicon carbide rods 14 as radiant resistors, and have found their life is no way impaired by our process. Other materials may be used as heating sources, which have similar electrical and radiant characteristics, and hence we do not wish to be limited thereto. We have used a high melting point glass or quartz tube as a protection for the radiant heating element.

We believe that the high efficiency of our process can be explained as follows:

While boric acid is readily dehydrated to metaboric acid, the high viscosity of this material does not allow it to receive energy readily by the heat transfer mechanisms of conduction and convection. Apparently this viscous material behaves approximately as a black body and takes up radiant energy readily. Further, by the use of electric thermal heating, we can coordinate the temperature of operation with the rate of flow and so secure optimum conditions for energy efficiency.

The following examples are set forth as illustrative of our invention and not by way of limitation. The process has been operated continuously for considerable periods of time; the process is not dependent on any given apparatus size.

*Example I*

| | |
|---|---|
| Length of run | 66.5 hours. |
| Voltage | 30 volts. |
| Current | 6.4 amps. |
| Heating Unit | SiC, 1⅜″ dia. |
| Feed rate boric acid | 189 g./hr. |
| Entering temperature | 430° C. |
| Exit temperature | 710° C. |
| Element temperature | 850° C. |
| Kw.-hr./lb. $B_2O_3$ | 0.87. |
| Chemical yield | 97.1%. |
| Residence time | 5.3 hours. |
| Energy efficiency | 75.3%. |
| Product purity | 98.7–99%. |

*Example II*

| | |
|---|---|
| Length of run | 21 hours. |
| Voltage | 28 volts. |
| Current | 16 amps. |
| Heating unit | SiC, 1½″ dia. |
| Feed rate boric acid | 340 g./hr. |
| Entering temperature | 430° C. |
| Exit temperature | 610° C. |
| Element temperature | 890° C. |
| Kw.-Hr./lb. $B_2O_3$ | 1.1. |
| Chemical yield | 99.0%. |
| Residence time | 2.0 hours. |
| Energy efficiency | 60%. |
| Product purity | 98.9–99.1%. |

*Example III*

| | |
|---|---|
| Length of run | 16 hours. |
| Voltage | 30 volts. |
| Current | 19 amps. |
| Heating unit | SiC, 1½″ dia. |
| Feed rate boric acid | 400 g./hr. |
| Entering temperature | 625° C. |
| Exit temperature | 730° C. |
| Element temperature | 920° C. |
| Kw.-hr./lb. $B_2O_3$ | 1.2. |
| Chemical yield | 99.0%. |
| Residence time | 1.6 hours. |
| Energy efficiency | 54%. |
| Product purity | 98.9–99.2%. |

*Example IV*

| | |
|---|---|
| Length of run | 6 hours. |
| Voltage | 25 volts. |
| Current | 18 amps. |
| Heating unit | SiC, 1½″ dia. |
| Feed rate boric acid | 380 g./hr. |
| Entering temperature | 650° C. |
| Exit temperature | 950° C. |
| Kw.-hr./lb. $B_2O_3$ | 0.84°. |
| Chemical yield | 99.0%. |
| Residence time | 2.8 hours. |
| Energy efficiency | 80%. |
| Product purity | 98.8–99.1%. |

We claim:

1. A continuous process for producing boric oxide comprising maintaining a first and a second dehydration zone in a side-by-side relationship and at a temperature of 320–1000° C. with a common radiant heating element extending across the bottom of both zones, the zones being separated by a common wall having an aperture therein through which the heating element extends, feeding solid boric acid into the first zone at a rate sufficient to maintain said element covered by and substantially surrounded with said boric acid and produce a mixture of boric oxide and water, and passing said mixture of boric oxide and water through said aperture into said second zone wherein the water is driven off and molten boric oxide is removed as a product.

2. A continuous process for producing boric oxide comprising maintaining a first and a second dehydration zone in a side-by-side relationship at a temperature of 320–1000° C. with a radiant heating element extending across the bottom of both zones inside said zones, feeding solid boric acid into the first zone at a rate sufficient to maintain said element covered by and substantially surrounded with said boric acid and produce a mixture of boric oxide and water, and passing said mixture of boric oxide and water through a restricted orifice provided in part by said radiant heating element into said second zone wherein the water is driven off and molten boric oxide is removed as a product from said second zone.

3. A continuous process for producing boric oxide comprising: passing boric acid into a reservoir therefor; thereafter passing said boric acid through a restricted zone having a radiant heating element positioned therein, said radiant heating element serving as substantially the sole heat source for the area circumscribed by the said zone, to heat said boric acid to a temperature of between about 320° and 1000° C. to form a melt, said boric acid being passed through said restricted zone at a rate such that water is driven therefrom and said boric acid converted first to metaboric acid and thereafter further water driven off and said metaboric acid converted to boric oxide, said melt being advanced at such a rate that said melt is entirely converted to boric oxide before exiting from said restricted zone, the said restricted zone and the said radiant heating element being so proportioned that the said element subjects the entirety of said melt to radiant energy when said melt passes through said zone.

References Cited in the file of this patent

UNITED STATES PATENTS

| 1,158,488 | Hadaway et al. | Nov. 2, 1915 |
| 1,450,464 | Thomson | Apr. 3, 1923 |
| 2,137,058 | McCulloch | Nov. 15, 1938 |
| 2,186,257 | McCulloch | Jan. 9, 1940 |
| 2,204,180 | Gerlach | June 11, 1940 |
| 2,378,772 | Hummel | June 19, 1945 |

OTHER REFERENCES

Mellor: "Comprehensive Treatise on Inorganic and Theoretical Chemistry," Longmans, Green and Co., New York, 1923, vol. 5, pages 41, 42.